(12) United States Patent
Smith, Jr. et al.

(10) Patent No.: US 7,557,747 B1
(45) Date of Patent: Jul. 7, 2009

(54) METHOD AND APPARATUS USING FAST ELECTRONIC SWITCHING FOR MULTI-CHANNELIZING A SINGLE-CHANNEL RADAR SYSTEM

(75) Inventors: Jerry Rosson Smith, Jr., Arlington, VA (US); Donald G. Morgan, Reston, VA (US); Paul E. Ransom, Jr., Greenbelt, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 379 days.

(21) Appl. No.: 11/398,233

(22) Filed: Apr. 5, 2006

Related U.S. Application Data

(60) Provisional application No. 60/672,561, filed on Apr. 13, 2005.

(51) Int. Cl.
*G01S 13/00* (2006.01)
*G01S 5/04* (2006.01)

(52) U.S. Cl. .......................... 342/74; 342/73; 342/444; 342/465

(58) Field of Classification Search ............. 342/73–74, 342/444–445, 465; 343/824
See application file for complete search history.

(56) References Cited

U.S. PATENT DOCUMENTS

| | | | |
|---|---|---|---|
| 3,670,275 A * | 6/1972 | Kalliomaki et al. | ......... 455/132 |
| 5,115,246 A | 5/1992 | Thomas, Jr. | |
| 5,248,981 A * | 9/1993 | Yoshihara et al. | ...... 342/357.15 |
| 5,917,448 A * | 6/1999 | Mickelson | .................. 342/442 |
| 6,018,317 A | 1/2000 | Dogan et al. | |
| 6,069,582 A | 5/2000 | Nelander | |
| 6,366,566 B1 | 4/2002 | Scott | |
| 6,388,631 B1 | 5/2002 | Livingston et al. | |
| 6,388,997 B1 | 5/2002 | Scott | |
| 6,400,306 B1 | 6/2002 | Nohara et al. | |
| 6,803,875 B1 | 10/2004 | Alford et al. | |
| 6,807,404 B2 * | 10/2004 | Meijer | ..................... 455/277.2 |

(Continued)

OTHER PUBLICATIONS

U.S. Appl. No. 60/672,561, filed Apr. 13, 2005, entitled "Method and Apparatus Using Fast Electronic Switching for Multi-Channelizing a Single-Channel Radar System," joint inventors Jerry Rosson Smith, Jr., Donald G. Morgan, Paul E. Ransom.

(Continued)

*Primary Examiner*—Isam Alsomiri
(74) *Attorney, Agent, or Firm*—Howard Kaiser

(57) ABSTRACT

According to typical practice of an inventive radar system, a switching device is capable of activating a receiver array one at a time so that when a receiver is activated the remaining receivers are inactivated. A switch control circuit is pre-programmed with control logic that is based on the counting of radio pulses that are emitted by a signal generator (for transmission by a transmitter). The control logic dictates, via the switching device, the rapid sequential cycling through of the arrayed receivers so that each receiver is activated for the same prescribed period of time, which corresponds to a pre-programmed number N of emitted radio pulses wherein N=[the number of frequencies in the wave table]×[the number of pulse integrations in the wave table]×[1 polarization or 2 polarizations]. Radio pulse input from the receivers is interleaved in a manner associable with individual receivers.

12 Claims, 5 Drawing Sheets

U.S. PATENT DOCUMENTS

| | | | |
|---|---|---|---|
| 6,947,204 | B2 | 9/2005 | Stone |
| 7,026,981 | B1 | 4/2006 | Smith, Jr. |
| 7,138,941 | B1 | 11/2006 | Smith, Jr. |
| 7,161,529 | B1 | 1/2007 | Smith, Jr. |
| 2002/0140597 | A1* | 10/2002 | Taylor et al. ............ 342/28 |
| 2006/0044204 | A1* | 3/2006 | Kruth ............... 343/824 |
| 2007/0052581 | A1* | 3/2007 | Shima ............... 342/173 |

OTHER PUBLICATIONS

U.S. Appl. No. 12/152,127, filed May 5, 2008, entitled "Remote Sensing of Wave Heights Using a Narrowband Radar Arrangement," sole inventor Jerry R. Smith, Jr.

U.S. Appl. No. 12/152,124, filed May 5, 2008, entitled "Remote Sensing of Wave Heights Using a Broadband Radar Arrangement," sole inventor Jerry R. Smith, Jr.

"New Acqiris Reconfigurable Analyzers Provide High-Speed Synchronous Dual-Channel Sampling and On-the-Fly Processing," Acqiris website, http://www.acqiris.com/news/2004/december-7-2004.html, Dec. 7, 2004, 2 pages printed out on Mar. 25, 2006.

Tanya L. Conroy and John B. Moore, "On the Estimation of Interleaved Pulse Train Phases," *IEEE Transactions on Signal Processing*, vol. 48, No. 12, Dec. 2000, pp. 3420-3425.

Jerry R. Smith, Jr., and Robert J. Burkholder, "Channeling Phenomenon in Electromagnetic Forward Scattering at Low Grazing," *IEEE Transactions on Geoscience and Remote Sensing*, vol. 42, No. 8, Aug. 2004, pp. 1731-1738.

* cited by examiner

| Horn # | Pulses | To |
|---|---|---|
| Horn 1 | 1 | NumFreq * NumInte * NumPole |
| Horn 2 | 1* NumFreq * NumInte * NumPole + 1 | 2 * NumFreq * NumInte * NumPole |
| Horn 3 | 2* NumFreq * NumInte * NumPole + 1 | 3 * NumFreq * NumInte * NumPole |
| ... | | |
| Horn N | (N-1)* NumFreq * NumInte * NumPole + 1 | N * NumFreq * NumInte * NumPole |

FIG. 2

METHOD AND APPARATUS USING FAST ELECTRONIC SWITCHING FOR MULTI-CHANNELIZING A SINGLE-CHANNEL RADAR SYSTEM

CROSS-REFERENCE TO RELATED APPLICATIONS

This application claims the benefit of U.S. provisional application No. 60/672,561, filing date 13 Apr. 2005, hereby incorporated herein by reference, entitled "Method And Apparatus Using Fast Electronic Switching For Multi-Channelizing a Single-Channel Radar System," joint inventors Jerry Rosson Smith, Jr., Donald G. Morgan and Paul E. Ransom.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to radar, more particularly to apparatuses and methods that employ one or more radar receiver channels for effecting monostatic or bistatic radar.

Both single-channel and multi-channel radar systems have been used effectively for a variety of applications. The term "radar" is acronymous for "radio detection and ranging." A single-channel radar system describes a single conveyance path of radio signals from a radar receiver element to a radar data storage device. Many applications require plural (e.g., multiple) radar receiver elements; typically, the radar receiver elements are selectively arranged as a "radar array." Radar arrays have traditionally been designed from the start with multiple receiver channels in parallel, wherein each receiver channel describes a separate conveyance path of radio signals from a radar receiver element to a radar data storage device. These multi-channel radar systems are usually large and expensive due to the duplication of the receiver components (e.g., the signal conditioners and amplifiers that are connected to a receiver horn antenna). Until the present, the modification of a single channel radar system into a radar array system has been problematical and has not been favored practice.

SUMMARY OF THE INVENTION

In view of the foregoing, it is an object of the present invention to provide a practical and economical radar array system that utilizes a single radar receiver channel.

The present invention uniquely combines a switching circuit with a single-channel radar device ("core radar system") so as to, in effect, convert a single-channel radar system to a plural-channel (e.g., multi-channel) radar system. The present invention can be practiced for either bistatic or monostatic radar systems. Inventive practice typically provides (for use in association with a single-channel radar device, single-polarized or dual-polarized) a fast electronic switching system that is combined with a radar receiver array. As often practiced, the inventive methodology constructs a radar array system from a single-channel core radar system by introducing quick switching between receiver array horns, the quick switch being effected by means of counting range gate signals (transmitter pulses). Thus, a single-channel radar system that is capable of implementing one receiver element at a time is inventively modified into a multi-channel radar system that is capable of implementing plural (e.g., an array of many) receiver elements one at a time but effectively at the same time.

Featured by the present invention is a switch control logic circuit, and the direction thereby of switches, to cycle through the receiver elements. The front-end receiver apparatus functions as a radar array but plugs directly into a single-channel radar device ("core radar system"). Furthermore, the inventive cycling through the receiver elements is typically characterized by great rapidity. The inventive switch control means electronically switches through the receiver array elements fast enough to permit clear imaging in post-processing. An analogy can be drawn to the sleight of hand of a dexterous playing card trickster, whose "hand is quicker than the eye"; in a sense, through its celerity and adroitness, the present invention "tricks" a single-input, single-output radar system into becoming a single-input, plural-output (e.g., multiple-output) radar system. Although the receiver array elements are actually sending signals sequentially rather than simultaneously, they are doing so at such a rapid rate that effective simultaneity of the respective signals is achieved.

According to typical embodiments of the present invention, an array of receiver elements feeds into a bank of fast electronic switches. The electronic switches control as to which receiver element is "open." The electronic switches are alternatively opened and closed based on a switch control logic circuit, which counts each individual radar pulse from the transmitter; each such transmitted radar "pulse" is also referred to herein as the "range gate signal" or "transmitter output signal." Once a predetermined number of pulses is encountered (wherein the number of pulses equals the number of integrations times the number of frequency steps; or, wherein the number of pulses equals the number of integrations times the number of frequency steps times the number of polarizations), the switch control logic circuit closes the current receiver path and opens the next consecutive receiver path. This switching, which occurs very quickly (typically within 800 nanoseconds), allows the individual elements of the radar array to be individually observed and fed into the single channel of the radar system and subsequently stored in the data file. The observations from the array elements are interleaved in the data file. In data translation, this interleaved data can be extracted into sequential data files for each element, thereby simplifying the post-processing data analysis.

A typical inventive radar array system comprises a switch control logic circuit, plural electronic switches, and plural receiver elements. This inventive radar array system "plugs" directly into the existing single channel of the core radar system. Inventive practice is thus versatile, as most single-channel radar systems can be inventively converted into a multi-channel radar array without direct modification of the core radar system. Moreover, an inventive radar array system is inherently less complicated and less expensive than a "from-the-ground-up" multi-channel radar array system, because the only duplication of components in inventive practice is in the receiver apertures. The present invention therefore permits radar arrays to be fielded more quickly and more economically than can the conventional multi-channel radar arrays.

The principles of the present invention are applicable to any of diverse types of energetic communication, wherein the term "energetic communication" is broadly defined as any system, process or activity involving the conveying of a signal or signals, and wherein the term "signal" is broadly defined as any form of energy, either electromagnetic (e.g., radio or light) or acoustic, that carries information or is otherwise informative. In accordance with typical practice of the present invention, a method for performing energetic communication comprises emitting plural energy pulses, and activating in succession a plurality of energy reception devices so that each energy reception device is activated in turn for a duration commensurate with a selected number of emitted energy pulses. Typically, the inventive method further comprises storing data so as to be associable with individual energy reception devices, the data being based on emitted energy pulses that are received by the energy reception devices. The energy reception devices are activated in succession for one or more (e.g., many) cycles of activations, each duration being greater than or equal to 800 nanoseconds, each energy reception device being activated for the same duration.

Examples of inventive applications involving electromagnetic energy include radar (radio energy), lidar (light energy), and telecommunications (radio energy or light energy). For instance, for typical radar applications of the inventive method, the energy pulses are radio pulses, the energy reception devices are receivers, and one or more transmitters transmit emitted radio energy. Some inventive applications, such as sonar, involve acoustic (sound) energy. For typical sonar applications of the inventive method, the energy pulses are sound pulses, the energy reception devices are hydrophones, and one or more projectors emit sound energy.

Other objects, advantages and features of the present invention will become apparent from the following detailed description of the invention when considered in conjunction with the accompanying drawings.

BRIEF DESCRIPTION OF THE DRAWINGS

The present invention will now be described, by way of example, with reference to the accompanying drawings, wherein like numbers indicate the same or similar components, and wherein:

FIG. 2 is a table setting forth the sequential ranges, in terms of numbers of pulses, of N number of receiver antennae (e.g., receiver horns), as typically practiced in accordance with the present invention.

DETAILED DESCRIPTION OF THE INVENTION

Figure 1:
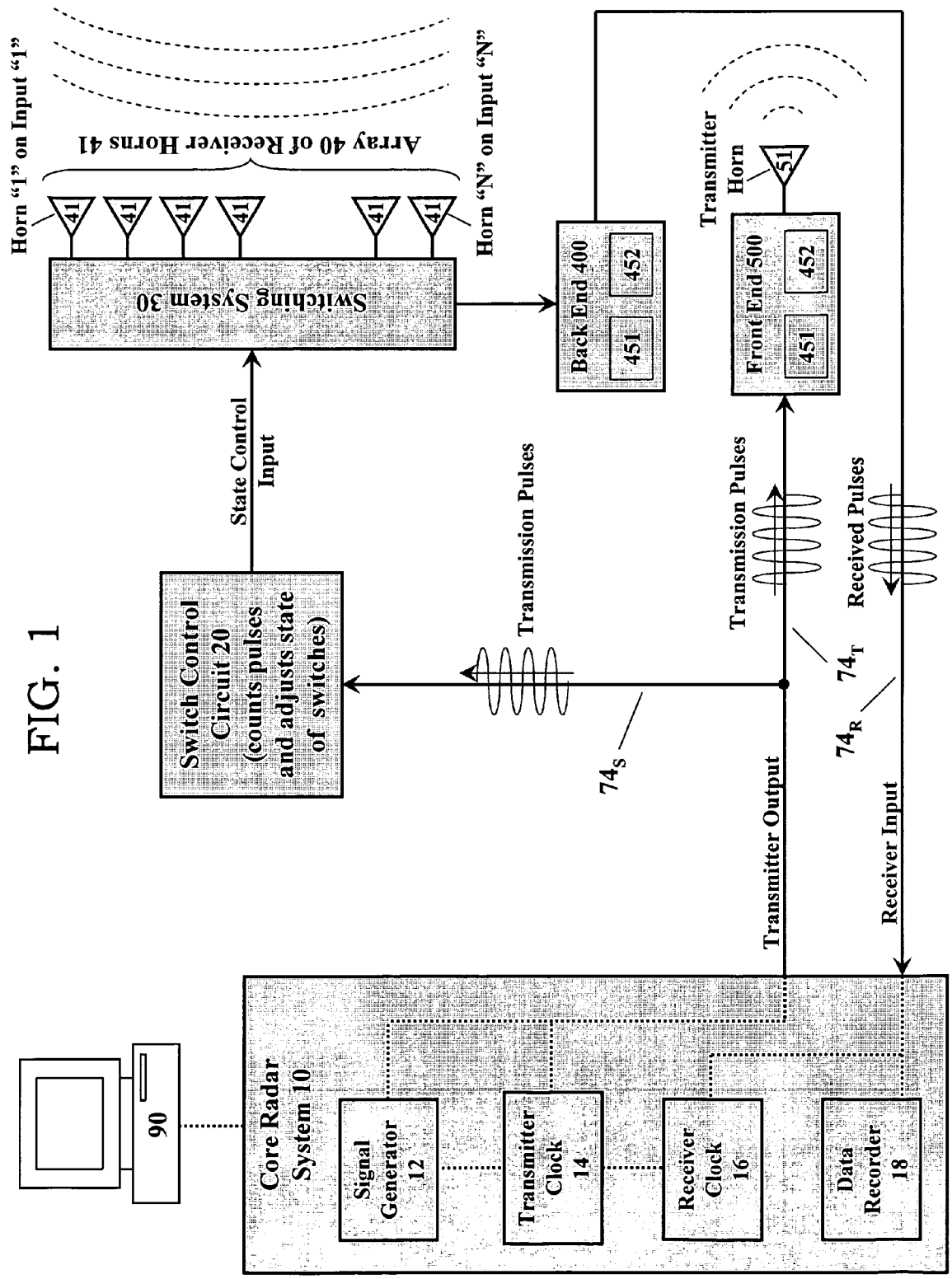
FIG. 1 is a schematic of a typical radar array system in accordance with the present invention.

Reference is now made to FIG. 1, which is a flow diagram of a typical radar array system in accordance with the present invention. Among its novel functions and aspects as typically practiced, the present invention uniquely provides for: (i) the counting of the transmitted pulses; and, (ii) the adjustment of the receiver horn switching system in accordance with the counting of the transmitted pulses.

Core radar system 10 emits and receives pulses of electromagnetic radiation, e.g., microwaves or other radio waves. Core radar system 10 includes a signal generator 12 (for emitting pulses), a transmitter clock 14 (for timing the emitted pulses), a receiver clock 16 (for synchronizing the received pulses with the emitted pulses), and a data recorder 18 (for recording data associated with the received pulses). Receiver dock 16 and transmitter dock 14 are synchronized to ensure the validity of the data received by the data recorder 18.

Core radar system 10 has information storage capability such as provided by data recorder 18, which not only includes a memory for storing digital data but also includes means for digitizing the analog signals received from the antennae 41. This stored digital data can be processed at a later time by a separate machine having a processor and a memory, e.g., computer 90 shown in FIG. 1. Instead of subsequently processing the data, some inventive embodiments provide for immediate receipt of data and processing thereof by a computer 90, such as one that is included in the core radar system 10. Data recorder 18 is a data storage device that is capable of receiving a single data stream of electromagnetic signals. In effect, the inventive methodology imparts plural-channel capability to the single-channel data storage device.

Signal generator (e.g., frequency synthesizer) 12 of core radar system 10 emits an $A_0$ initialization pulse to transmitter 51. Switch control circuit 20 receives the $A_0$ initialization pulse, sets the pulse counter to zero (Pulse_Ctr=0), and re-initializes the state of the switching system 30. Radar begins to work through the wave table. A "wave table" is an organized sequence of radar pulses that are emitted from core radar system 10's signal generator 12 to the transmitter 51. During continuous operations, the core radar system 10 repeatedly "passes through" the wave table. Typically, before each pass, signal generator 12 emits an initialization pulse, called the "A-naught" ("$A_0$") pulse. Each transmission pulse in the wave table is processed in several "phases," including the phases referred to hereinbelow as "Phase 1," "Phase 2," and "Phase 3."

Phase 1

Signal generator 12 of core radar system 10 emits a transmitter output pulse for transmission to front end apparatus 500 and to switch control circuit 20. In emitting the transmission pulse, signal generator 12 opens the range gate of a receiver horn 41. A "range gate" is a window in time when the radar system 10 "listens" to a receiver horn 41; the time corresponds with a fixed distance or "range" from the receiver 41. The longer is the delay in the range gate, the farther is the range.

Phase 2

Front end apparatus 500 includes a conditioner 451 and an amplifier 452. The transmission pulse is conditioned and amplified by the front end 500 and is transmitted via input line $74_T$ to the transmitter horn 51.

The transmission pulse is received by the switch control logic circuit 20 via an input line $74_S$. The switch control circuit 20 counts the electromagnetic pulses emitted by the signal generator 12. Each emitted pulse that is received by the switch control circuit 20 causes the switch control circuit 20 to increment its pulse counter by one (i.e., Pulse_Ctr=Pulse_Ctr+1). The switch control circuit 20 then determines the appropriate receiver horn 41 state, based on the newly incremented pulse counter, using the formula set forth in FIG. 2. "NumFreq" is the number of frequencies in the wave table. "NumInte" is the number of pulse integrations in the wave table. "NumPole" is the number of polarizations.

Each receiver horn 41 is open for the same designated number of pulses, which equals the product (NumFreq)×(NumInte)×(NumPole). According to typical inventive practice, in order to reduce system noise, the signal is integrated over multiple, consecutive pulses. These are referred to as "pulse integrations." "Polarization" is determined by the direction of the electric field. "NumPole" is selected to be either one or two; that is, "NumPole" is one (horizontal direction), or one (vertical direction), or two (both horizontal and vertical directions).

The switch control circuit 20 adjusts the state of the switching system 30 so that the output of the appropriate receiver horn 41 is directed to the back end apparatus 400. According to typical inventive practice, the switch control circuit 20 causes the switching system 30 to at least once "cycle through" antennae 41, in turn for a predetermined duration (e.g., greater than or equal to 800 nanoseconds), so that each receiver antenna 41 is activated (receptive to incoming radio signals) while the remaining receiver antennae 41 are inactivated (non-receptive to incoming radio signals). The term "cycle" in this context refers to one complete performance of sequential activations through all of the receiver antennae 41 of the receiver array 40; upon the conclusion of a cycle, switch control circuit 20 returns switching system 30 to the starting point (viz., the sequentially first receiver 41) of the next cycle. In each cycle, receiver horns 41 are activated by switching system 30 in succession, one receiver horn 41 at a time, each receiver horn 41 being activated for a duration that accords with the counting of the emitted electromagnetic signals by switch control circuit 20.

The present invention is frequently practiced so that the antennae 41 are cycled through repeatedly (i.e., at least twice—more typically, numerous times); the complete succession of events (i.e., all of the activations, in turn, of receivers 41) is repeated again and again, continually and uniformly in the same order. The duration of activation for each receiver horn 41 is the same and is equal to either (i) the product of the number of frequencies in said wave table times the number of pulse integrations in said wave table or (ii) the product of the number of frequencies in said wave table times the number of pulse integrations in said wave table times the number of polarizations (the number of polarizations being either "1" or "2").

Phase 3

The incident radar energy impinges on the receiver array 40. Similarly as the front end apparatus 500, the back end apparatus 400 includes a conditioner 451 and an amplifier 452. The radar energy from the appropriate receiver horn 41 is sent to the back end 400 for signal conditioning and amplifying. The amplified and conditioned signal (receiver input signal) is then transmitted via line $74_R$ so as to be received by the core radar system 10 and recorded by its data recorder 18. Included in the recorded data are the pulse number and the burst number, which can be used in post-processing to determine precisely to which receiver horn 41, frequency, polarization, and integration number the recorded data corresponds.

The pulse signals received from the antenna array 40 are interleaved by data recorder 18; that is, the input data from the receiver horns 41 are arranged by data recorder 18 in alternating levels, sectors or blocks so that each level/block/sector carries a piece of a different data stream. In essence, plural data recorder 18 "channels," corresponding one-to-one to the plural receiver antenna horns 41, are created by data recorder 18 through time-division multiplexing (TDM) of the radio signals that are carried thereto by receiver input line 74R. The input signals are interleaved so that each data recorder 18 "channel" corresponds to a different receiver horn 41.

After the radar has passed through the wave table, the radar begins again by emitting an $A_0$ initialization pulse to the transmitter horn 51, and the sequence repeats until interrupted by the operator.

Figure 3:
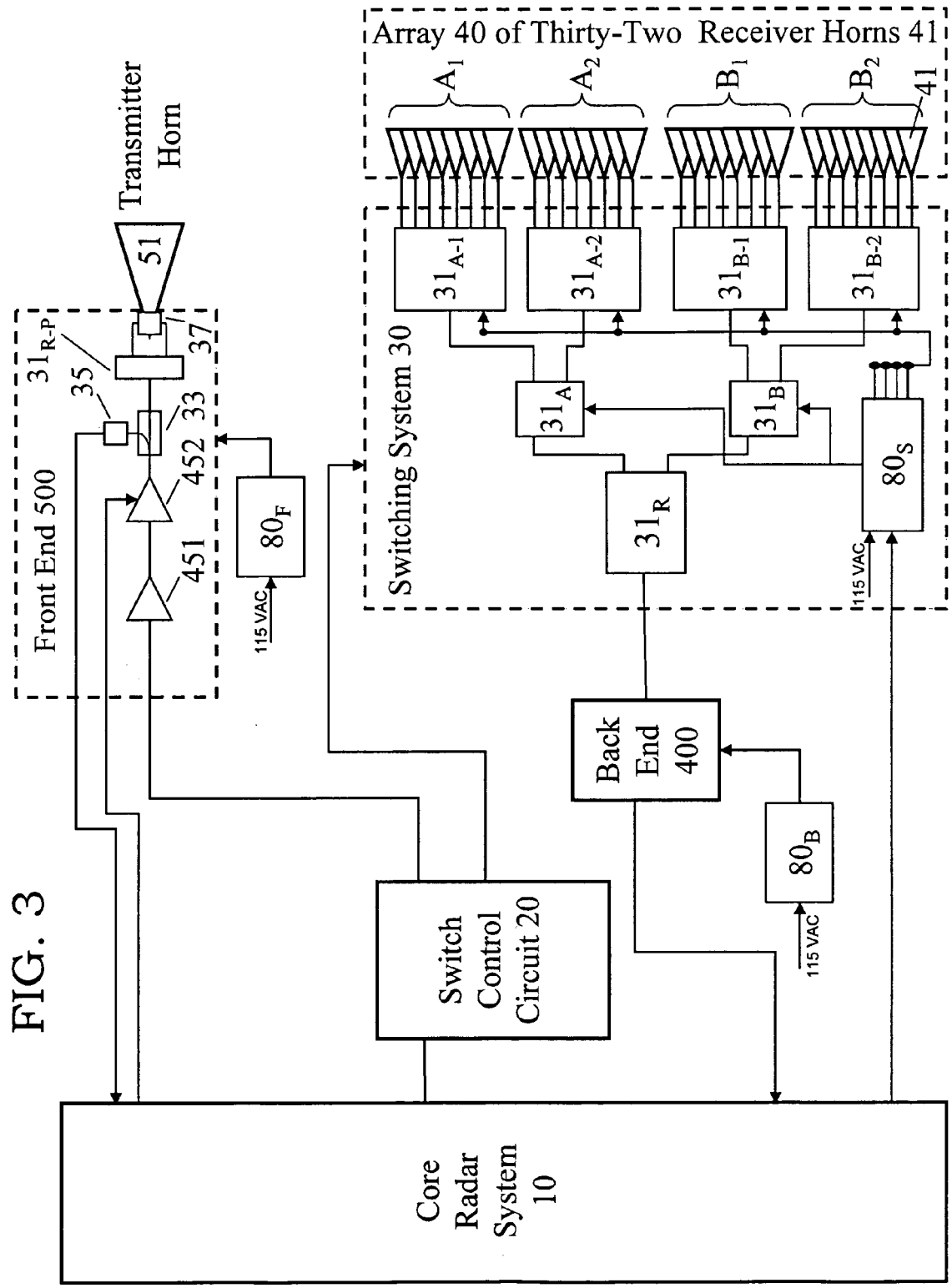
FIG. 3 is a schematic of an experimental embodiment that was tested on or about 4 Sep. 2004 by the U.S. Navy in accordance with the present invention.

With reference to FIG. 3, the U.S. Navy's experimental 32-element, dual-polarized array of September 2004 cost approximately $100 k to implement, not including the non-recurring design and engineering costs. The inventive experimental system was capable of toggling through the receiver (Rx) horns 41 of the linear array 40 to provide SAR-like data. The electronic switching control circuit 20 controlled the states (e.g., polarization and horn number) of the receiver horns 41. Cross-range mapping was performed in post-processing, wherein the phase relationship(s) between/among receiver horns 41 was/were similar to that for conventional SAR (Synthetic Aperture Radar) systems.

Each of the receivers 41 that were used (in the two linear arrays of sixteen receivers 41 each) in the September 2004 inventive experimentation was an 8-18 GHz, dual polarized receiver (dual polarized quad-ridged horn antenna, type number 201187-4, manufactured by TECOM Industries, Inc., located at 375 Conejo Ridge Avenue, Thousand Oaks, Calif., website www.tecom-ind.com). A 2-18 GHz, dual polarized transmitter 51 (dual polarized quad-ridged horn antenna, series DF240, model DP240-AB, manufactured by Flann Microwave, located at Dunmere Road, Bodmin, Cornwall, PL31 2Ql, UK, and Baldwin Park 1, 12 Alfred St., Ste. 300, Woburn, Mass., website www.flann.com) was used in the September 2004 inventive experimentation. The core radar system 10 was a commercially available single-channel radar unit manufactured by Lintek, now owned by Aeroflex Incorporated, 35 South Service Road, Plainview, N.Y., website www.aeroflex.com.

A commercial programmable circuit board was used for the switch control circuit 20. The programmable board was patched into the transmitter line (isolated with one-way opto-isolators so that the programmable board would not corrupt the transmission signal). This circuit board could be reprogrammed at will whenever the number of receiver horns 41, number of frequencies, etc., was/were adjusted. Any programmable electronic means can be used as the switch control circuitry 20 in accordance with the present invention, such as that which includes a programmable logic device or a processor (e.g., microprocessor).

As shown in FIG. 3, thirty-two receiver horns were cycled through, using cascading switches 31. The Robinson switch $31_R$ alternated between the "A" group of receiver horns 41 (by choosing switch $31_A$) and the "B" group of receiver horns 41 (by choosing switch $31_B$). Group "A" switch $31_A$ and group "B" switch $31_B$ each alternated between two banks of eight horns 41 each. The group "A" switch, switch $31_A$, chose either switch $31_{A-1}$ or switch $31_{A-2}$; the group "B" switch, switch $31_B$, chose either switch $31_{B-1}$ or switch $31_{B-2}$. The inventors desired sixteen H-pole (horizontal-pole) receiver horns 41 and sixteen V-pole (vertical-pole) receiver horns 41 for this application; accordingly, group A (consisting of banks A-1 and A-2) was H-pole, and group B (consisting of banks B-1 and B-2) was V-pole.

Front end apparatus 500 and back end apparatus 400 were powered by front end power supply $80_R$ and back end power supply $80_B$, respectively. Switching system 30 was also provided with its own power supply, viz., switch power supply 80S. Front end apparatus 500 is shown in FIG. 3 to include a signal conditioner 451, an amplifier 452, a directional coupler 33 (which is connected to the core radar system 10), a detector 35, a Robinson switch $31_{R\text{-}P}$, and a transmit module 37 (which is connected between Robinson switch $31_{R\text{-}P}$ and transmitter horn 51). Robinson switch $31_{R\text{-}P}$ chose between horizontal polarity and vertical polarity (or both horizontal and vertical polarities) of the radar energy as was transmitted by transmitter horn 51.

The multi-level switching system illustrated in FIG. 3 was designed in this manner mainly for cost-saving reasons and in fact performed adequately, but it is not suggested herein as representative of a preferred switching system 30 configuration in accordance with the present invention. Preferred inventive practice is for the present invention's switching system 30 to be as efficient as possible. Such efficiency would tend to be promoted by employment of as few switches and/or switching levels as practicable, perhaps by employing even a single electronic switching device.

According to generally preferred inventive practice, it is important that the practitioner make sure that the switch control circuit 20 is fast enough to: (a) count the transmitter pulses, (b) determine the necessary state of the switches, and (c) transmit any adjustments to the switching system 30. In addition, it is important for the practitioner to make sure that the switching system 30 reacts sufficiently fast. If there is too much lag, then the radar energy intended for the "N+1" receiver horn 41 will actually be circuited through the "N" receiver horn 41, and hence the intendedly organized data stream will become disorganized. This guidance is particularly significant for radar sets that run extremely fast.

Figure 4:
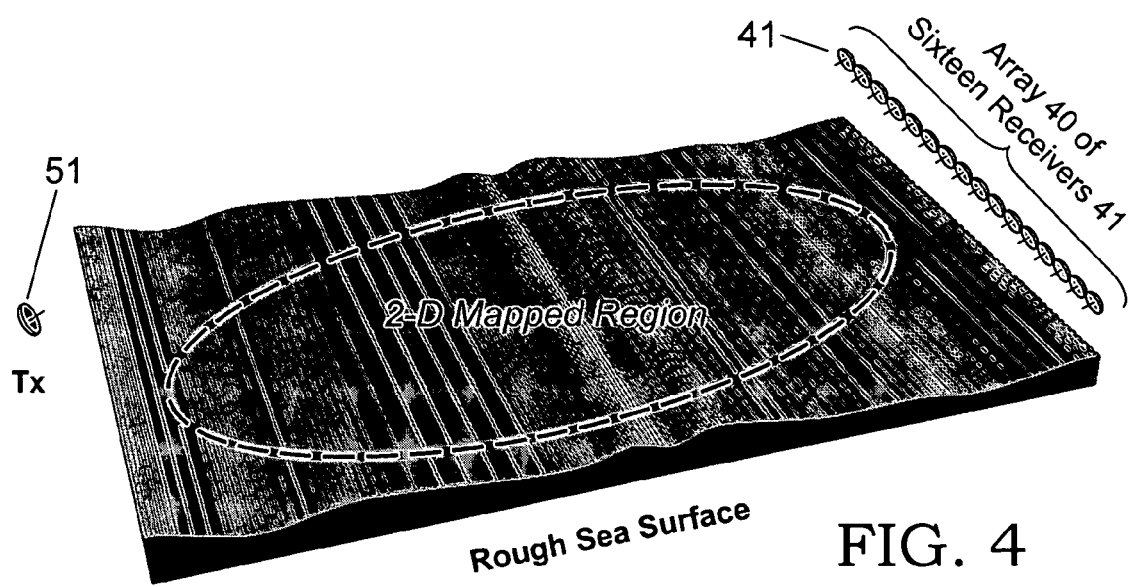
FIG. 4 is a schematic illustrating, in three dimensions, an embodiment of a bistatic radar array proposed for future U.S. Navy testing in accordance with the present invention.
Figure 5:
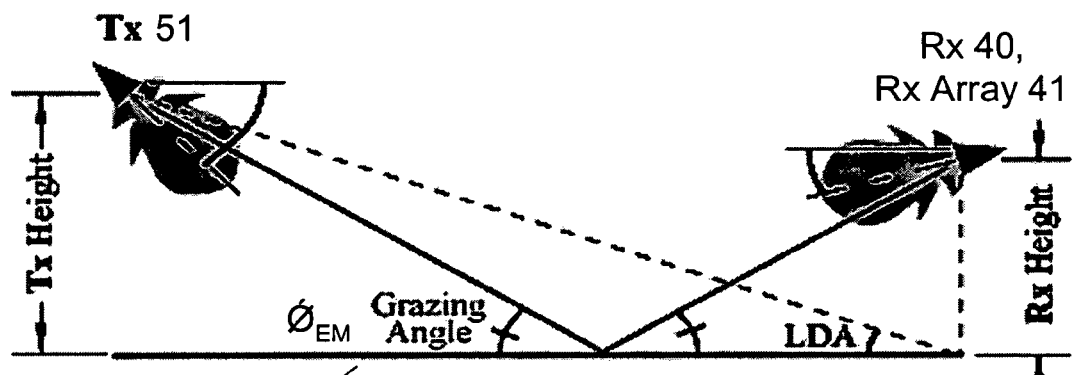
FIG. 5 is a schematic, in elevation view (not to scale or proportion), of an embodiment of a forward scattering test (bistatic radar) that can be practiced in accordance with the present invention.
Figure 6:
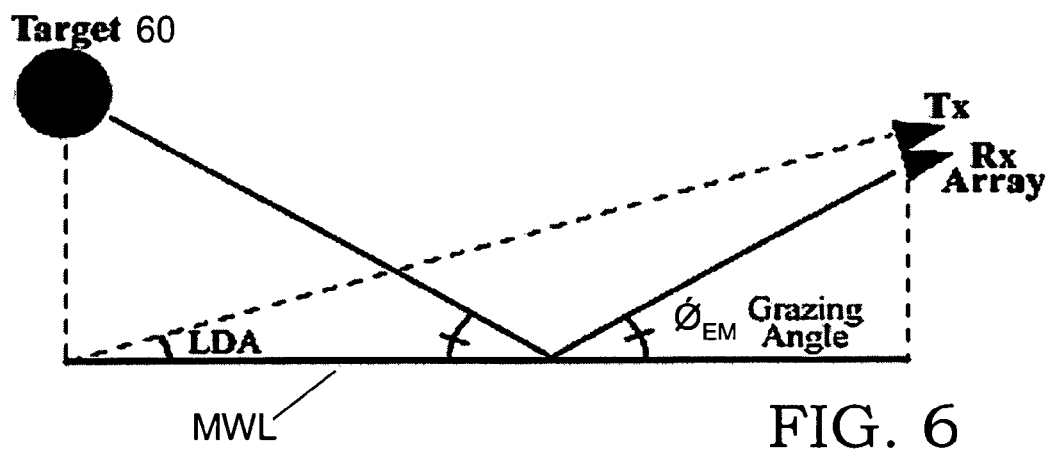
FIG. 6 is a schematic, in elevation view (not to scale or proportion), of an embodiment of a target scattering test (monostatic radar) that can be practiced in accordance with the present invention.
Figure 7:
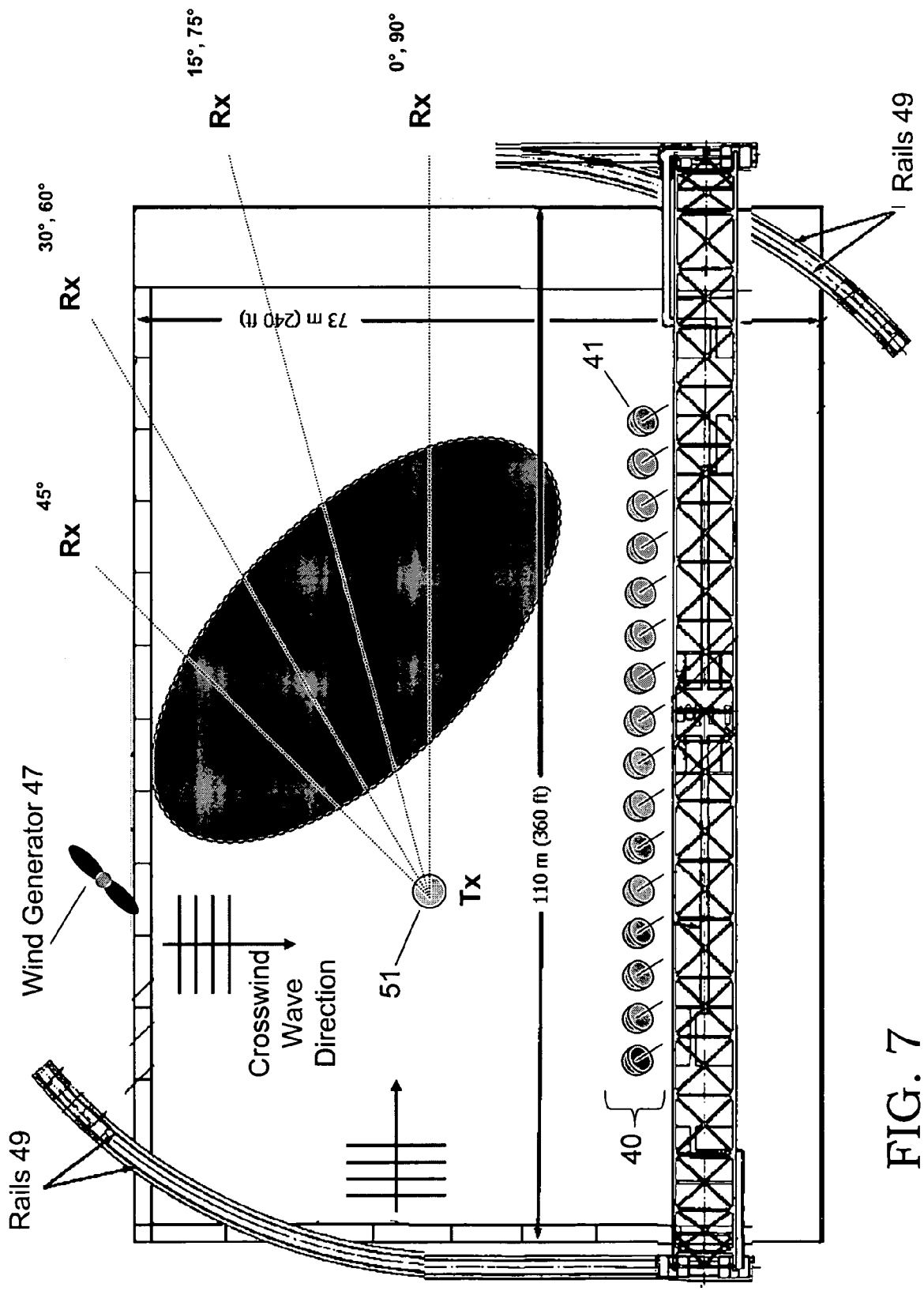
FIG. 7 is a schematic, in elevation view, of an embodiment of bistatic radar involving a movable receiver array, such inventive embodiment being practicable in accordance with the present invention.

With reference to FIG. 4 through FIG. 7, the present invention can be practiced for either bistatic radar systems (for example, as shown in FIG. 4, FIG. 5 and FIG. 7) or monostatic radar systems (for example, as shown in FIG. 6). FIG. 5 (bistatic radar) and FIG. 6 (monostatic radar) are more generally illustrative. The term "bistatic" as used herein is synonymous with the term "multistatic."

As shown in FIG. 5, according to a typical bistatic application of the present invention, the transmitter horn 51 and the receiver array 40 (of receiver horns 41) are situated at different locations. As shown in FIG. 6, according to a typical monostatic application of the present invention, the transmitter horn 51 and the receiver array 40 (of receiver horns 41) are situated at the same or approximately the same location. The separation distance between transmitter horn 51 and a receiver horn 41 is the "range" or "baseline," which is significant for bistatic radar and insignificant (or nonexistent) for monostatic radar. Angle "LDA" indicated in FIG. 5 is the geometric elevation angle to transmitter 51 at the base of a receiver horn 41. Grazing angle "Ø $_{EM}$" indicated in FIG. 5 is the elevation angle, at the forward scatter location of the mean water level "MWL," of the forward scatter of the electromagnetic radiation (e.g., radio waves) from a receiver horn 41 to transmitter horn 51. Angle "LDA" indicated in FIG. 6 is the geometric elevation angle to transmitter 51 at the base of a target 61. Grazing angle "Ø $_{EM}$" indicated in FIG. 6 is the elevation angle, at the forward scatter location of the mean water level "MWL," of the forward scatter of the electromagnetic radiation (e.g., radio waves) from target 61 to a receiver horn 41.

According to some inventive embodiments, such as illustrated in FIG. 4, measurements are made to map scattering from a sea surface. A proposed MASK Test 2 by the U.S. Navy will include: more sea states (0, 2, 3, 3½, 4, 4½, 5, 6); multiple wave directions; 3-D laser profiling of waves; effects with and without wind (a wind generator, such as wind generator 47 shown in FIG. 7, will be used); a wider range of radar threat bands (X and Ku). The proposed radar measurement will be for the X and Ku Bands (8-18 GHz). Wide bandwidth will allow down-range imaging of sea surface, providing time-of-flight information. An array 40 of receivers 41 will allow cross-range imaging of the sea surface, similar to an acoustic line array. This uniquely designed radar imaging system in accordance with the present invention can thus perform 2-D mapping of sea reflection.

FIG. 7 shows a preliminary test setup, contemplated by the U.S. Navy, featuring a linear array 40 of receiver horns 41 that is movable via rails 49. Among the notable aspects of such an inventive system are: testing of multiple wave directions (e.g., 360° FS/MP map); testing of more sea states (e.g., to map transition from coherent to diffuse, and/or to consider limited swell effects); testing of wind effects using wind generator 47 (e.g., to determine the effects of small-scale roughness); mapping of the scattering sea surface using linear array 40.

The present invention, which is disclosed herein, is not to be limited by the embodiments described or illustrated herein, which are given by way of example and not of limitation. Other embodiments of the present invention will be apparent to those skilled in the art from a consideration of the instant disclosure or from practice of the present invention. Various omissions, modifications and changes to the principles disclosed herein may be made by one skilled in the art without departing from the true scope and spirit of the present invention, which is indicated by the following claims.

What is claimed is:

1. An electromagnetic receiver array system comprising:
    a plurality of receiver antennae for receiving electromagnetic pulses;
    a switching device associated with said receiver antennae and capable of causing each said receiver antenna to be in one of an active state and an inactive state, wherein when a said receiver antenna is in said active state said receiver antenna is receptive to electromagnetic pulses, and wherein when a said receiver antenna is in said inactive state said receiver is not receptive to electromagnetic pulses;
    a switch control circuit associated with said switching device and capable of controlling said switching device so that at any given time one said receiver antenna is in said active state and every other said receiver antenna is in said inactive state, and so that said receiver antennae are sequentially cycled through said active states; and
    means for emitting electromagnetic pulses, said means for emitting electromagnetic pulses being associated with said switch control circuit;
    wherein each said receiver antenna is in said active state for a duration commensurate with a selected number of emitted electromagnetic pulses, wherein each said receiver antenna is in said active state for the same said duration, wherein said emitted electromagnetic pulses are characterized by a wave table, and wherein said switch control circuit is characterized by logic whereby each said duration equals the product of the number of frequencies in said wave table times the number of pulse integrations in said wave table.

2. The electromagnetic receiver array system of claim 1, wherein said switch control circuit is capable of controlling said switching apparatus so that said receiver antennae are sequentially cycled through said active states at least twice.

3. The electromagnetic receiver array system of claim 1, further comprising a data storage device associated with said receiver antennae and capable of storing information pertaining to electromagnetic pulses received by said receiver antennae, said storing being effected in an interleaved manner so that each portion of said information corresponds with receipt of electromagnetic pulses by a particular said receiver antenna.

4. The electromagnetic receiver array system of claim 1, wherein said duration is no less than 800 nanoseconds.

5. An electromagnetic receiver array of system comprising:
a plurality of receiver antennae for receiving electromagnetic pulses;
a switching device associated with said receiver antennae and capable of causing each said receiver antenna to be in one of an active state and an inactive state, wherein when a said receiver antenna is in said active state said receiver antenna is receptive to electromagnetic pulses, and wherein when a said receiver antenna is in said inactive state said receiver is not receptive to electromagnetic pulses;
a switch control circuit associated with said switching device and capable of controlling said switching device so that at any given time one said receiver antenna is in said active state and every other said receiver antenna is in said inactive state, and so that said receiver antennae are sequentially cycled through said active states; and
means for emitting electromagnetic pulses, said means for emitting electromagnetic pulses being associated with said switch control circuit;
wherein: each said receiver antenna is in said active state for a duration commensurate with a selected number of emitted electromagnetic pulses, each said receiver antenna is in said active state for the same said duration; said emitted electromagnetic pulses are characterized by a wave table; said switch control circuit is characterized by logic whereby each said duration equals the product of the number of frequencies in said wave table times the number of pulse integrations in said wave table times the number of polarizations; said number of polarizations is either of one or two; said number of polarizations of one represents either of horizontal polarization and vertical polarization; said number of polarizations of two represents both of horizontal polarization and vertical polarization.

6. The electromagnetic receiver array system of claim 5, further comprising a data storage device associated with said receiver antennae and capable of storing information pertaining to electromagnetic pulses received by said receiver antennae, said storing being effected in an interleaved manner so that each portion of said information corresponds with receipt of electromagnetic pulses by a particular said receiver antenna at a particular time.

7. The electromagnetic receiver array system of claim 5, further comprising at least one transmitter antenna for transmitting said emitted electromagnetic pulses, wherein at least one transmitted said emitted electromagnetic pulse is received by at least one said receiver antenna.

8. A method for using plural receiver antennae, the method comprising:
associating a switching device with plural receiver antennae, said switching device being capable of causing each said receiver antenna to be in one of an active state and an inactive state, wherein when a said receiver antenna is in said active state said receiver antenna is receptive to electromagnetic signals, and wherein when a said receive antenna is in said inactive state said receiver is not receptive to electromagnetic signals;
associating a switch control circuit with said switching device, said switch control circuit being capable of controlling said switching apparatus so that at any given time one said receiver antenna is in said active state and every other said receiver antenna is in said inactive state, and so that said receiver antennae are sequentially cycled through said active states; and
associating said switch control circuit with means for emitting electromagnetic signals;
wherein each said receiver antenna is in said active state for a duration commensurate with a selected number of electromagnetic signals emitted from a transmitter antenna, wherein emitted electromagnetic signals are characterized by a wave table, and wherein each said duration equals the product of the number of frequencies in said wave table times the number of signal integrations in said wave table.

9. The method for using plural receiver antennae as recited in claim 8, said method further comprising storing data pertaining to electromagnetic signals received by said receiver antennae, said storing being effected in an interleaved manner so that each portion of said data corresponds with receipt of electromagnetic signals by a particular said receiver antenna.

10. The method for using plural receiver antennae as recited in claim 9, said storing being effected in an interleaved manner so that each portion of said data corresponds with receipt of electromagnetic signals by a particular said receiver antenna at a particular time.

11. The method for using plural receiver antennae as recited in claim 8, wherein said duration is at least 800 nanoseconds, and wherein each said receiver antenna is in said active state for the same said duration.

12. A method for using plural receiver antennae, the method comprising:
associating a switching device with plural receiver antennae, said switching device being capable of causing each said receiver antenna to be in one of an active state and an inactive state, wherein when a said receiver antenna is in said active state said receiver antenna is receptive to electromagnetic signals, wherein when a said receiver antenna is in said inactive state said receiver is not receptive to electromagnetic signals;
associating a switch control circuit with said switching device, said switch control circuit being capable of controlling said switching apparatus so that at any given time one said receiver antenna is in said active state and every other said receiver antenna is in said inactive state, and so that said receiver antennae are sequentially cycled through said active states; and
associating said switch control circuit with means for emitting electromagnetic signals;
wherein: each said receiver antenna is in said active state for a duration commensurate with a selected number of electromagnetic signals emitted from a transmitter antenna; said emitted electromagnetic signals are characterized by a wave table; each said duration equals the product of the number of frequencies in said wave table times the number of signal pulse integrations in said wave table times the number of polarizations; said number of polarizations is either of one and two; said number of polarizations of one represents either of horizontal polarization and vertical polarization; said number of polarizations of two represents both of horizontal polarization and vertical polarization.

* * * * *